United States Patent
Kato et al.

(10) Patent No.: US 10,864,816 B2
(45) Date of Patent: Dec. 15, 2020

(54) STRUCTURE FOR LOWER PORTION OF VEHICLE BODY

(71) Applicant: HONDA MOTOR CO., LTD., Tokyo (JP)

(72) Inventors: Takashi Kato, Wako (JP); Masaaki Yamane, Wako (JP); Satoru Kawabe, Wako (JP); Takenobu Haga, Wako (JP); Ken Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/099,223

(22) PCT Filed: Apr. 24, 2017

(86) PCT No.: PCT/JP2017/016198
§ 371 (c)(1),
(2) Date: Nov. 6, 2018

(87) PCT Pub. No.: WO2017/221540
PCT Pub. Date: Dec. 28, 2017

(65) Prior Publication Data
US 2019/0210452 A1  Jul. 11, 2019

(30) Foreign Application Priority Data
Jun. 24, 2016 (JP) .................. 2016-125988

(51) Int. Cl.
*B60K 13/04* (2006.01)
*B62D 25/20* (2006.01)

(52) U.S. Cl.
CPC .............. *B60K 13/04* (2013.01); *B62D 25/20* (2013.01)

(58) Field of Classification Search
CPC ........ B62D 25/20; B62D 21/11; B62D 21/02; B62D 29/008; B62D 21/00;
(Continued)

(56) References Cited

U.S. PATENT DOCUMENTS

| 5,501,289 | A | * | 3/1996 | Nishikawa | ............... | B60K 1/04 180/68.5 |
| 8,689,919 | B2 | * | 4/2014 | Maeda | ................. | B62D 21/157 180/311 |

(Continued)

FOREIGN PATENT DOCUMENTS

| CN | 203957819 | 11/2014 |
| CN | 205186311 | 4/2016 |

(Continued)

OTHER PUBLICATIONS

International Search Report and Written Opinion for International Application No. PCT/JP2017/016198 dated May 30, 2017, 8 pgs.
Chinese Office Action for Chinese Patent Application No. 201780026844.5 dated Jun. 3, 2020.

*Primary Examiner* — D Glenn Dayoan
*Assistant Examiner* — Sunsurraye Westbrook
(74) *Attorney, Agent, or Firm* — Amin, Turocy & Watson, LLP

(57) ABSTRACT

A structure for a lower portion of a vehicle body includes a right side sill (14), a right floor frame (17), a right cross member (68), and a muffler. A fuel tank is provided on an inner side of the right floor frame (17) in a vehicle width direction. The right cross member (68) spans between the right floor frame (17) and the right side sill (14) and extends in the vehicle width direction. Furthermore, the muffler is provided in a region enclosed by the right side sill (14), the right floor frame (17), and the right cross member (68). The right cross member (68) has an upward deformation guiding part (77). The upward deformation guiding part (77) is (Continued)

formed to be able to be deformed upward due to an impact load (F2) input to the right side sill (14).

8 Claims, 13 Drawing Sheets

(58) Field of Classification Search
CPC ............ B62D 25/2036; B62D 25/2018; B62D 21/155; B23K 20/122; B23K 20/125; B23K 20/1265; B23K 2101/006; B23K 2101/185; B23K 2103/20; B23K 31/02
USPC ....... 296/204, 193.07, 187.09, 29, 205, 209, 296/37.6, 37.2, 26.08, 191, 1.08; 29/897.2, 469
See application file for complete search history.

(56) References Cited

U.S. PATENT DOCUMENTS

| | | | |
|---|---|---|---|
| 9,259,998 B1* | 2/2016 | Leanza | B60K 1/04 |
| 9,758,192 B2* | 9/2017 | Hamdoon | B62D 21/157 |
| 2013/0118824 A1 | 5/2013 | Maeda et al. | |
| 2015/0183468 A1 | 7/2015 | Shirooka | |
| 2016/0347161 A1* | 12/2016 | Kusumi | B60K 1/04 |
| 2017/0106916 A1* | 4/2017 | Ajisaka | B60K 13/04 |
| 2018/0072352 A1* | 3/2018 | Shimoda | B60K 6/40 |

FOREIGN PATENT DOCUMENTS

| | | |
|---|---|---|
| JP | 2006-151146 | 6/2006 |
| JP | 2010-163039 | 7/2010 |
| JP | 2015-123887 | 7/2015 |
| WO | 2012/014776 | 2/2012 |

* cited by examiner (a)

(b)

STRUCTURE FOR LOWER PORTION OF VEHICLE BODY

TECHNICAL FIELD

The present invention relates to a structure for a lower portion of a vehicle body.

Priority is claimed on Japanese Patent Application No. 2016-125988, filed Jun. 24, 2016, the content of which is incorporated herein by reference.

BACKGROUND ART

A structure in which a cross member extends from both sides of a floor tunnel to a side sill outward in a vehicle width direction and a beam member is provided inside the floor tunnel is known as a structure for a lower portion of a vehicle body. The beam member has a downward concavity formed in an upper portion thereof. Furthermore, a muffler (that is, in-vehicle component) is disposed below a beam seat. Thus, when the beam member is deformed downward due to an impact load input to the side sill, the muffler can be pushed downward from the floor tunnel by the beam member. Therefore, it is possible to absorb an impact load by appropriately deforming the floor tunnel (refer to, for example, Patent Literature 1).

CITATION LIST

Patent Literature

Patent Literature 1

Japanese Unexamined Patent Application, First Publication No. 2006-151146

SUMMARY OF INVENTION

Technical Problem

Here, there is a structure in which a muffler is provided near a side sill side among structures for a lower portion of a vehicle body. In this case, the muffler is disposed below a cross member. For this reason, when a concavity is formed in an upper portion of the cross member as in a beam member, it is conceivable to push the muffler downward from a floor tunnel with the cross member.

However, when the concavity is formed in the upper portion of the cross member, a lower portion of the cross member is located on a lower side. For this reason, it is difficult to secure a minimum ground clearance of the muffler.

Also, when the muffler is displaced in a vehicle body forward/rearward direction of the cross member, even when the cross member is deformed, it is difficult to push the muffler downward with the cross member.

Aspects associated with the present invention were made in view of such circumstances and an objective of the present invention is to provide a structure for a lower portion of a vehicle body capable of securing a minimum ground clearance and absorbing an impact load.

Solution to Problem

The present invention adopts the following aspects to solve the above-described problems.

(1) A structure for a lower portion of a vehicle body according to an aspect of the present invention includes: a floor panel provided below a passenger compartment; a side sill provided on an outer side of the floor panel in a vehicle width direction and configured to extend in a forward/rearward direction of a vehicle body; a floor frame provided on an inner side of the side sill in the vehicle width direction and configured to extend in the forward/rearward direction of the vehicle body; an energy source provided on an inner side of the floor frame in the vehicle width direction; a cross member configured to span between the floor frame and the side sill and configured to extend in the vehicle width direction; and an in-vehicle component provided in a region enclosed by the side sill, the floor frame, and the cross member, wherein the cross member has an upward deformation guiding part capable of being deformed upward due to an impact load input to the side sill.

In this way, the in-vehicle component is provided in the region enclosed by the side sill, the floor frame, and the cross member and the upward deformation guiding part is formed in the cross member. Furthermore, the upward deformation guiding part is formed to be able to be deformed upward due to an impact load. Thus, it is possible to deform the upward deformation guiding part into an upward ridge-folded state (a folded state in an inverted V shape). It is possible to lift the floor frame upward to the cross member.

Thus, it is possible to allow the in-vehicle component to fall downward by allowing the floor frame to interfere with the upper portion of the in-vehicle component. Therefore, it is possible to absorb an impact load input to the side sill by appropriately deforming the side sill inward in the vehicle width direction without affecting the energy source.

Also, the in-vehicle component is disposed in the region enclosed by the side sill, the floor frame, and the cross member. Thus, it is possible to dispose the in-vehicle component at a relatively high position and to secure a minimum ground clearance of a vehicle.

(2) In the aspect of (1) described above, the cross member may be joined to an inner wall of the side sill and a lower portion of the side sill, and strengths may increase in order of the inner wall, the lower portion, the upward deformation guiding part, and the floor frame.

Thus, the inner wall in the side sill is first recessed in a concave shape due to an impact load input to the side sill. Subsequently, the lower portion of the side sill is deformed to have a rising slope inward in the vehicle width direction. Thus, upward ridge-folded deformation of the upward deformation guiding part of the cross member starts. In addition, when the upward deformation guiding part is deformed into an upward ridge-folded state, the floor frame is displaced to lift upward.

Thus, it is possible to allow the in-vehicle component to fall downward by allowing the cross member to interfere with the upper portion of the in-vehicle component.

(3) In the aspect of (2) described above, when a load is input to the floor frame due to an interference of the in-vehicle component in a state in which the upward deformation guiding part is deformed upward, a downward component force of the load may be larger than an upward component force thereof.

In this way, the downward component force in a load input to the floor frame is set to be greater than the upward component force. The in-vehicle component is pushed downward by the downward component force. Thus, it is possible to allow the in-vehicle component to be reliably pushed downward when the in-vehicle component interferes with the floor frame.

(4) In the aspect of (3) described above, the in-vehicle component may be a muffler, and the muffler may be formed in a substantially elliptical shape and a radius of an upper portion curved surface on the floor frame side may be larger than a radius of a lower portion curved surface thereon.

Here, when an impact load is input to the side sill, the floor frame is displaced upward. Thus, the upper portion of the muffler interferes with the floor frame. The radius of the upper portion curved surface of the muffler is set to be larger than the radius of the lower portion curved surface thereof. Therefore, when the muffler interferes with the floor frame, the downward component force can be set to be significantly greater than the upward component force. Accordingly, it is possible to reliably push the in-vehicle component downward.

(5) In the aspect of (3) described above, the in-vehicle component may be a canister.

Here, the canister is a member whose width in the vehicle width direction is larger than that of the muffler. For this reason, when the canister falls due to an impact load input to the side sill, the canister comes into contact with the ground. Thus, the canister is sandwiched between the side sill and the floor frame and the deformation of the side sill is minimized by the canister. For this reason, it is unlikely that the side sill will absorb an impact.

Thus, when an impact load is input to the side sill, the floor frame is displaced upward. By displacing the floor frame upward, it is possible to displace the floor frame upward of the canister when the canister falls. Thus, it is possible to deform the side sill without affecting the canister. As a result, an impact load input to the side sill can be absorbed.

(6) In the aspect of (3) described above, a relationship among a first distance from the upward deformation guiding part to the side sill, a second distance from the upward deformation guiding part to the floor frame, and an amount of displacement of the floor frame upward may be set to: (first distance)−(second distance)≥(amount of displacement).

Here, when the upward deformation guiding part of the cross member is deformed upward, it is necessary to displace the floor frame upward. For this reason, it is desirable to bring a position of the floor frame close to the upward deformation guiding part.

Thus, the relationship is set to (first distance)−(second distance)≥(amount of displacement). Therefore, when the upward deformation guiding part is formed, it is possible to reliably displace the floor frame upward. Accordingly, it is possible to allow the in-vehicle component to reliably fall downward by allowing the floor frame to interfere with the upper portion of the in-vehicle component.

(7) In the aspect of (6) described above, in the upward deformation guiding part, a strength of a portion on the in-vehicle component side may be lower than that of a portion opposite to the in-vehicle component side in the forward/rearward direction of the vehicle body.

Thus, when the upward deformation guiding part is displaced, particularly, it is possible to easily deform a portion on the in-vehicle side into an upward ridge-folded state. Therefore, when the upward deformation guiding part is deformed, it is possible to reliably displace the floor frame on the in-vehicle component side upward. Accordingly, it is possible to allow the in-vehicle component to reliably fall downward.

(8) In the aspect of (6) described above, the in-vehicle component may be attached to the side sill.

Thus, it is possible not to displace the in-vehicle component upward in a state in which the upward deformation guiding part is deformed in a ridge-folded state. Therefore, it is possible to allow the upper portion of the in-vehicle component to reliably interfere with the floor frame. Accordingly, it is possible to allow the in-vehicle component to reliably fall downward.

(9) In the aspect of (4) described above, the floor frame may have: a concave portion formed above an exhaust pipe joined to the muffler and avoiding the exhaust pipe; and a rear frame portion located on a rear side of the concave portion and formed with a constant cross section.

In this way, a concave portion is provided in the floor frame to avoid the exhaust pipe. Thus, the exhaust pipe (that is, the muffler) can be disposed on an upper portion. Accordingly, it is possible to secure a minimum ground clearance of the vehicle.

Also, the rear frame portion is provided on the rear portion of the concave portion. The rear frame portion is formed with a constant cross section. Thus, a front collision load input to the floor frame can be supported by the floor frame.

(10) In the aspect of (1) described above, the floor frame may have a central frame portion which is disposed facing the energy source in the vehicle width direction and in which a height is larger than that of the energy source on the vehicle body front side and the vehicle body rear side, and the central frame portion may have vertical beads extending in an upward/downward direction on at least one of an outer wall on an outer side in the vehicle width direction and an inner wall on an inner side in the vehicle width direction.

In this way, a height of the central frame portion in the upward/downward direction is increased by providing the central frame portion in the floor frame. In addition, the vertical beads are formed in the central frame portion. Thus, it is possible to increase the rigidity of the central frame portion. Therefore, it is possible to secure the rigidity of the floor of the passenger compartment using the central frame portion.

(11) In the aspect of (1) described above, when the in-vehicle component is sandwiched between the side sill and the floor frame in a state in which the upward deformation guiding part is deformed upward and a load is input to each of the side sill and the floor frame due to the inference of the in-vehicle component, a pushing force applied to the in-vehicle component may be greater than a frictional force.

In this way, a pushing force applied to the in-vehicle component in a load input to the side sill and the floor frame is set to be greater than a frictional force. The in-vehicle component is pushed downward by the pushing force. Thus, even when the in-vehicle component is strongly sandwiched between the side sill and the floor frame and does not fall due to the downward component force due to the floor frame only, it is possible to reliably push the in-vehicle component downward even in consideration of a coefficient of friction of the side sill.

Advantageous Effects of Invention

According to the aspects of the present invention, an upward deformation guiding part is formed in a cross member. An in-vehicle component is allowed to fall downward by deforming the upward deformation guiding part upward. Therefore, it is possible to absorb an impact load by deforming a side sill.

Also, the in-vehicle component is disposed in a region enclosed by the side sill, a floor frame, and the cross member. Therefore, it is possible to dispose the in-vehicle component at a relatively high position and to secure a minimum ground clearance of a vehicle.

DESCRIPTION OF EMBODIMENTS

Figure 1:
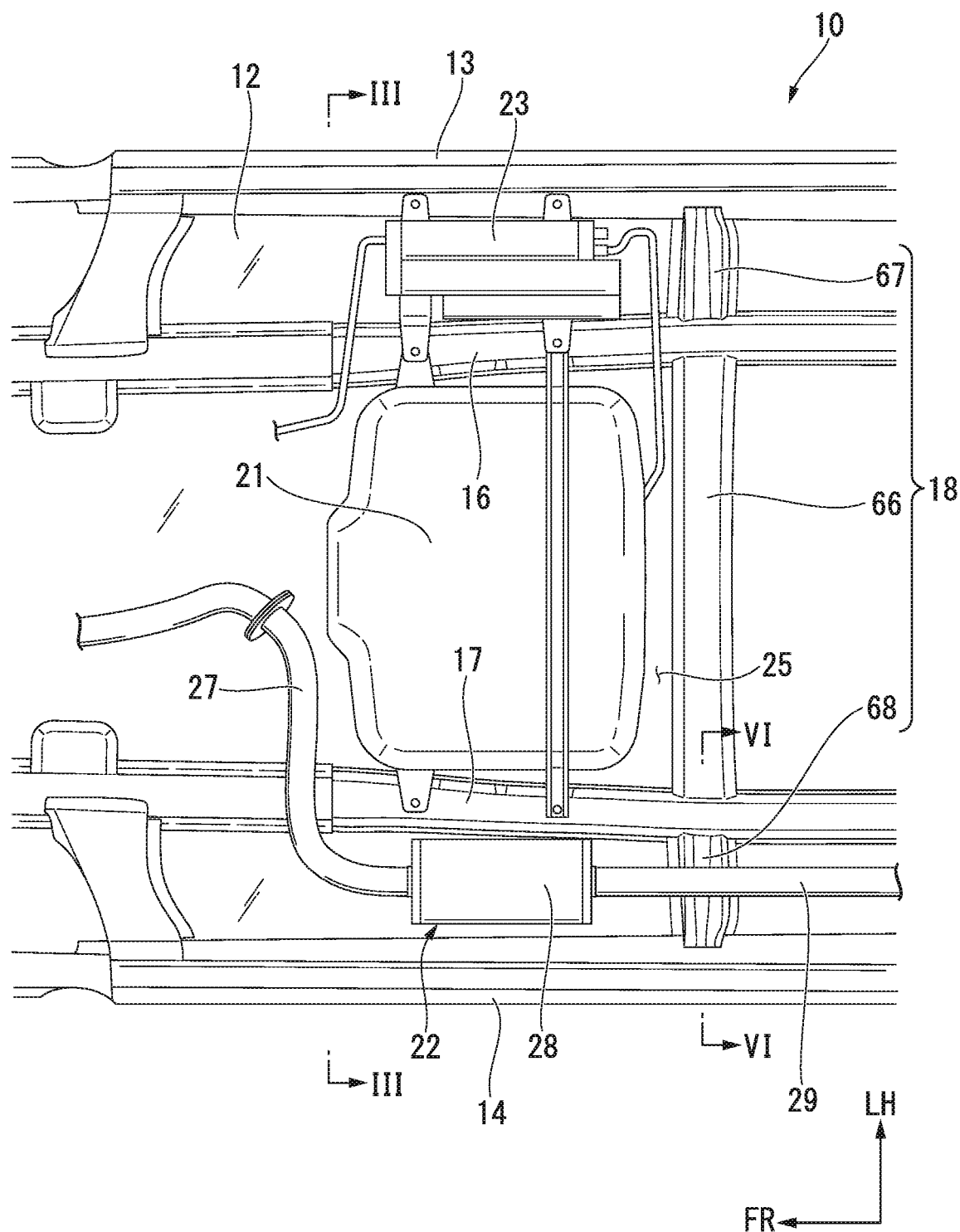
FIG. 1 is a bottom view showing a structure for a lower portion of a vehicle body according to a first embodiment of the present invention.

Embodiments of the present invention will be described below on the basis of the drawings. In the drawings, an arrow FR, an arrow UP, and an arrow LH indicate the front, the upper side, and the left side of a vehicle, respectively.

In a structure 10 for a lower portion of a vehicle body according to an embodiment, a left side portion and a right side portion are substantially symmetrical to each other. In addition, respective constituent elements in the left side portion and the right side portion will be denoted by the same reference numerals and the respective constituent elements in the left side portion will be described in detail.

First Embodiment

As illustrated in FIG. 1, the structure 10 for a lower portion of a vehicle body includes a floor panel 12, a left side sill 13 provided on the left side of the floor panel 12, a right side sill 14 provided on the right side of the floor panel 12, a left floor frame 16 provided inside the left side sill 13, and a right floor frame 17 provided inside the right side sill 14.

Also, the structure 10 for a lower portion of a vehicle body includes a cross member 18 configured to span between the left side sill 13 and the right side sill 14, a fuel tank 21, an exhaust unit 22, and a canister 23.

The fuel tank 21 is provided in a region 25 which is below the floor panel 12 and in a center in a vehicle width direction. The region 25 is enclosed by the left floor frame 16, the right floor frame 17, and the cross member 18 (specifically, a central cross member 66). In other words, the fuel tank 21 is provided on an inner side of the left floor frame 16 in the vehicle width direction and on an inner side of the right floor frame 17 in the vehicle width direction.

Figure 2:
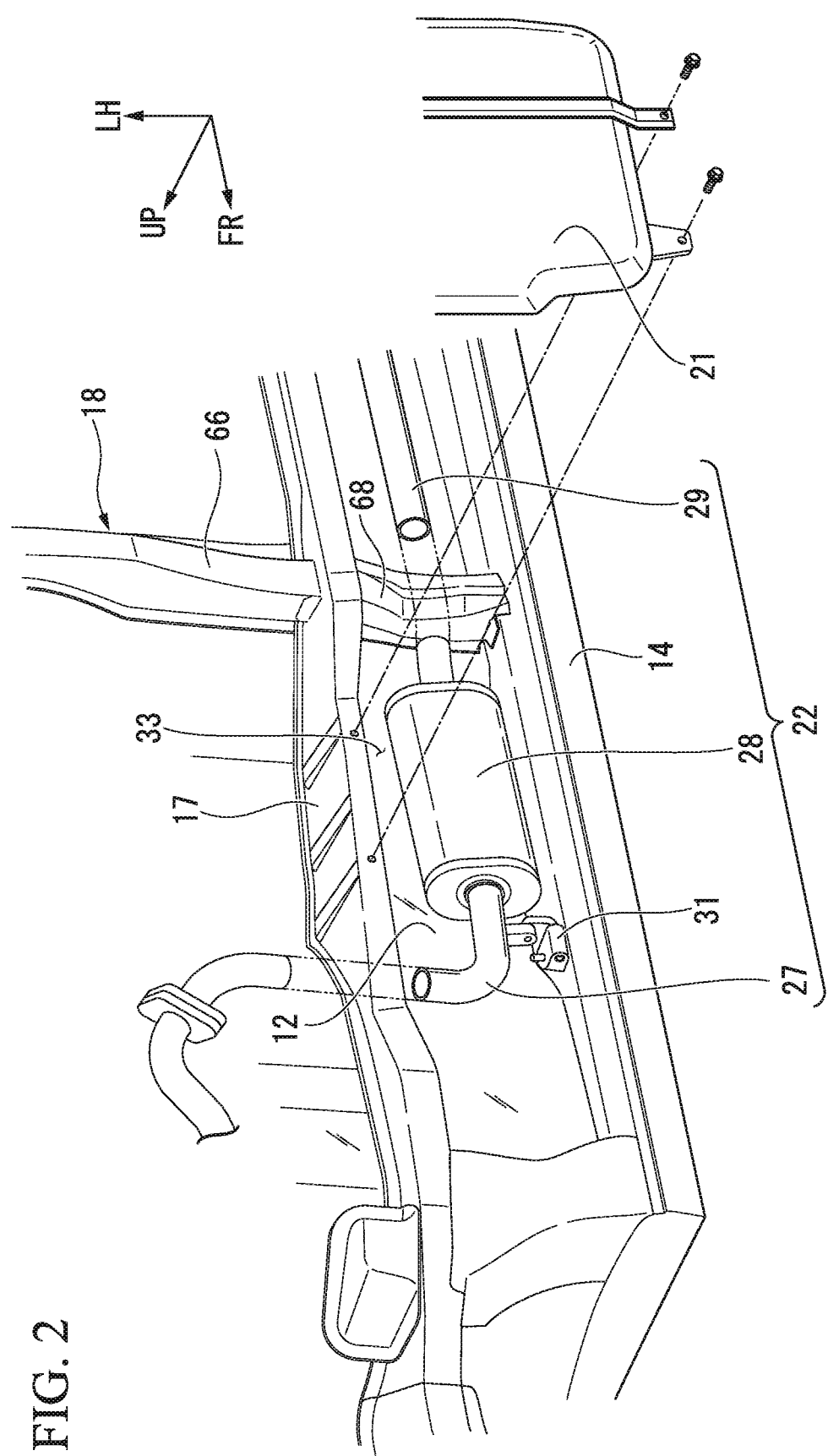
FIG. 2 is a perspective view showing a right side portion of the structure for a lower portion of a vehicle body according to the first embodiment of the present invention.

As illustrated in FIG. 2, the exhaust unit 22 includes a first exhaust pipe 27 from an exhaust manifold of an engine to the rear side of the vehicle body, a muffler 28 communicating with the first exhaust pipe 27, and a second exhaust pipe 29 extending from the muffler 28 toward the rear side of the vehicle body. In the exhaust unit 22, the muffler 28 is attached to the right side sill 14 through a front connection portion 31 and the second exhaust pipe 29 is attached to the rear portion of the vehicle body through a rear connection portion.

The first exhaust pipe 27 extends to the muffler 28 via the lower side of the right floor frame 17. The second exhaust pipe 29 extends from the muffler 28 toward the rear side of the vehicle body via the lower side of the cross member 18 (specifically, a right cross member 68).

The muffler 28 is provided in a region 33 which is below the floor panel 12 and near the right side sill 14. The region 33 is enclosed by the right side sill 14, the right floor frame 17, and the cross member 18 (specifically, the right cross member 68).

Figure 3:
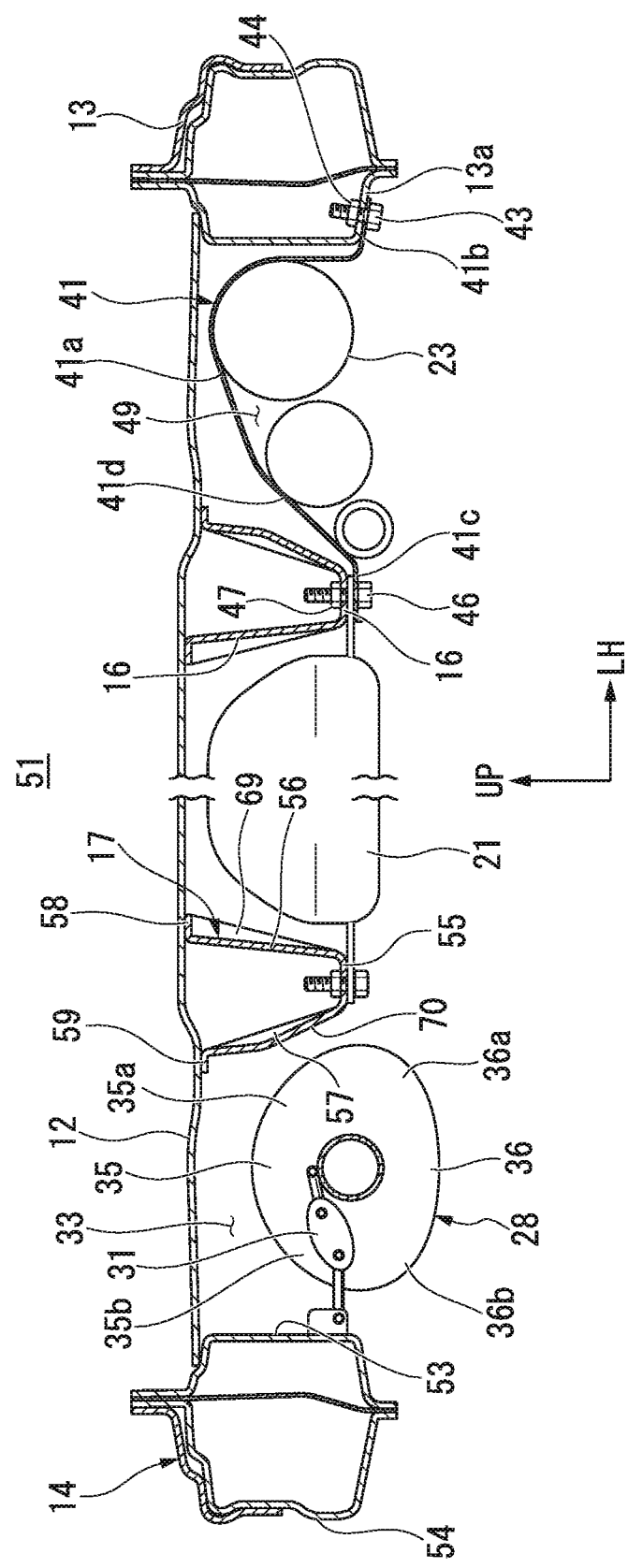
FIG. 3 is a cross-sectional view taken along line III-III in FIG. 1 in the first embodiment of the present invention.

As illustrated in FIG. 3, the muffler 28 is formed in a substantially elliptical shape and an upper portion 35 is formed to expand upward with respect to a lower portion 36. To be specific, in the muffler 28, a radius of an upper left curved surface 35a and an upper right curved surface 35b is formed to be larger than a radius of a lower left curved surface 36a and a lower right curved surface 36b.

Here, the upper left curved surface 35a and the lower left curved surface 36a are located on the right floor frame 17 side.

That is to say, the radius of the upper left curved surface 35a located on the right floor frame 17 side is formed to be larger than the radius of the lower left curved surface 36a.

It should be noted that the reason why the radius of the upper left curved surface 35a is formed to be larger than the radius of the lower left curved surface 36a will be described in detail later.

Figure 4:
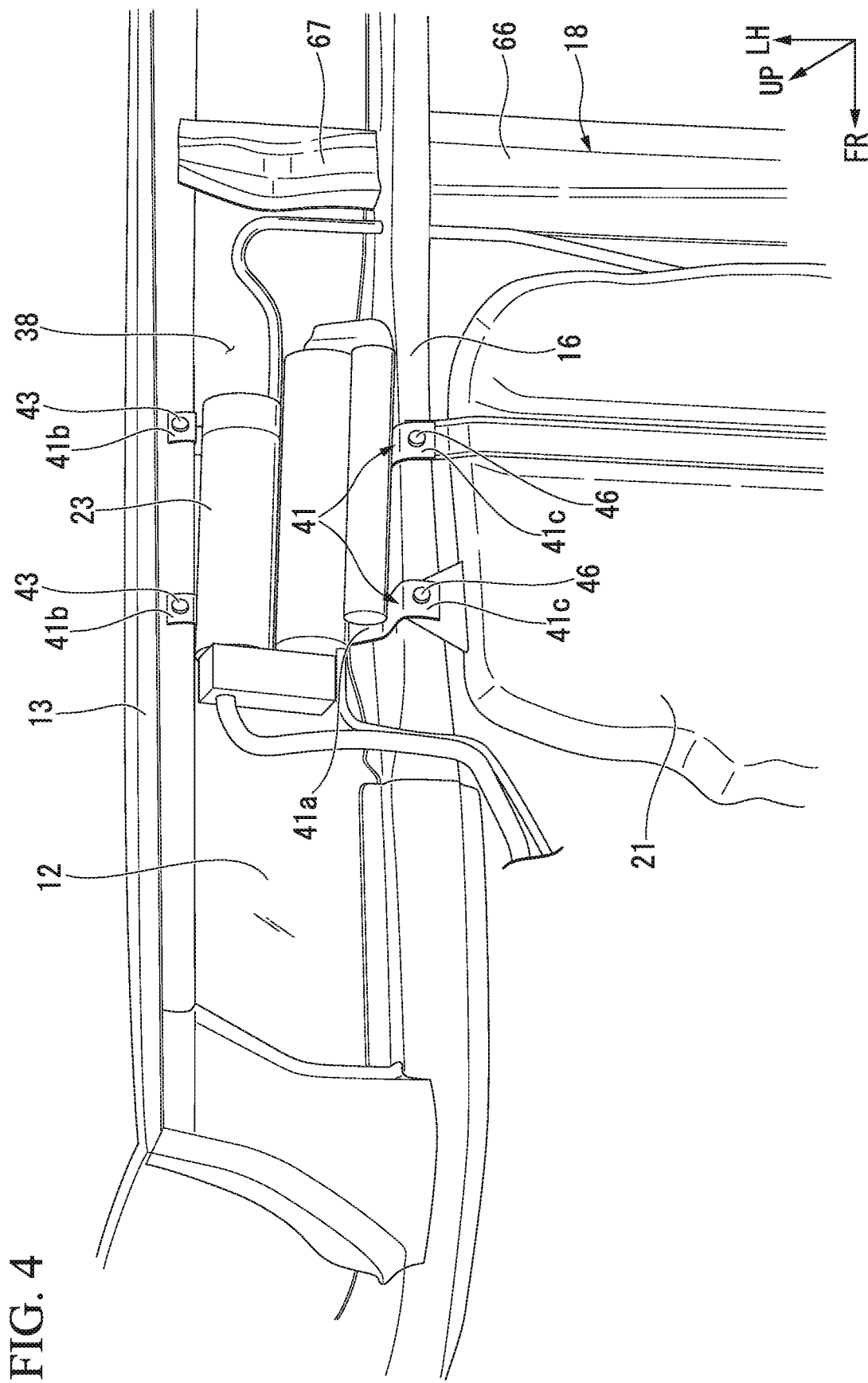
FIG. 4 is a perspective view showing a left side portion of the structure for a lower portion of a vehicle body according to the first embodiment of the present invention.

As illustrated in FIG. 4, the canister 23 is used to minimize the emission of vapor in the fuel tank 21. The canister 23 is provided in a region 38 which is below the floor panel 12 and near the left side sill 13. The region 38 is enclosed by the left side sill 13, the left floor frame 16, and the cross member 18 (specifically, a left cross member 67).

Referring again to FIG. 3, the canister 23 is attached to the left side sill 13 and the left floor frame 16 via a pair of attachment brackets 41 (refer to also FIG. 4). To be specific, the pair of attachment brackets 41 include expanding portions 41a whose centers expand upward, outer end portions 41b provided on outer sides of the expanding portions 41a in the vehicle width direction, and inner end portions 41c provided on inner sides of the expanding portions 41a in the vehicle width direction.

The outer end portions 41b of the pair of attachment brackets 41 are attached to a lower portion 13a of the left side sill 13 by bolts 43 and nuts 44. Furthermore, the inner end portions 41c of the pair of attachment brackets 41 are attached to a bottom portion 16a of the left floor frame 16 by bolts 46 and nuts 47.

When the pair of attachment brackets 41 expand upward, lower surfaces of the pair of attachment brackets 41 are formed to be recessed upward. Thus, a space 49 is formed below the pair of attachment brackets 41 and the canister 23 is disposed in the space 49. The canister 23 disposed in the space 49 is attached to the pair of attachment brackets 41.

In this state, a right inclined portion 41d of each of the expanding portions 41a is located on the left floor frame 16 side. The right inclined portion 41d is formed in an inclined shape having a rising slope from each of the inner end portions 41c outward in the vehicle width direction.

The floor panel 12 is a plate member which is provided below a passenger compartment 51 and forms a floor portion.

The right side sill 14 is provided on the right outer side of the floor panel 12 in the vehicle width direction and extends in a forward/rearward direction of the vehicle body. Furthermore, the right side sill 14 is formed in a closed cross section by an inner member 53 and an outer member 54.

The left side sill 13 is a member which is substantially symmetrical to the right side sill 14. In addition, the right side sill 14 will be described below and a detailed description of the left side sill 13 will be omitted.

The right floor frame 17 is provided on the right inner side of the right side sill 14 in the vehicle width direction and extends in the forward/rearward direction of the vehicle body. The right floor frame 17 includes a bottom portion 55, an inner wall 56, an outer wall 57, an inner flange 58, and an outer flange 59.

The right side sill 14 is formed in a substantially hat-shaped cross section by the bottom portion 55, the inner wall 56, the outer wall 57, the inner flange 58, and the outer flange 59. The inner flange 58 and the outer flange 59 are joined to the floor panel 12. A closed cross section is formed by the right floor frame 17 and the floor panel 12.

The left floor frame 16 is a member which is a substantially symmetrical to the right floor frame 17. In addition, the right floor frame 17 will be described below and a detailed description of the left floor frame 16 will be omitted.

Figure 5:
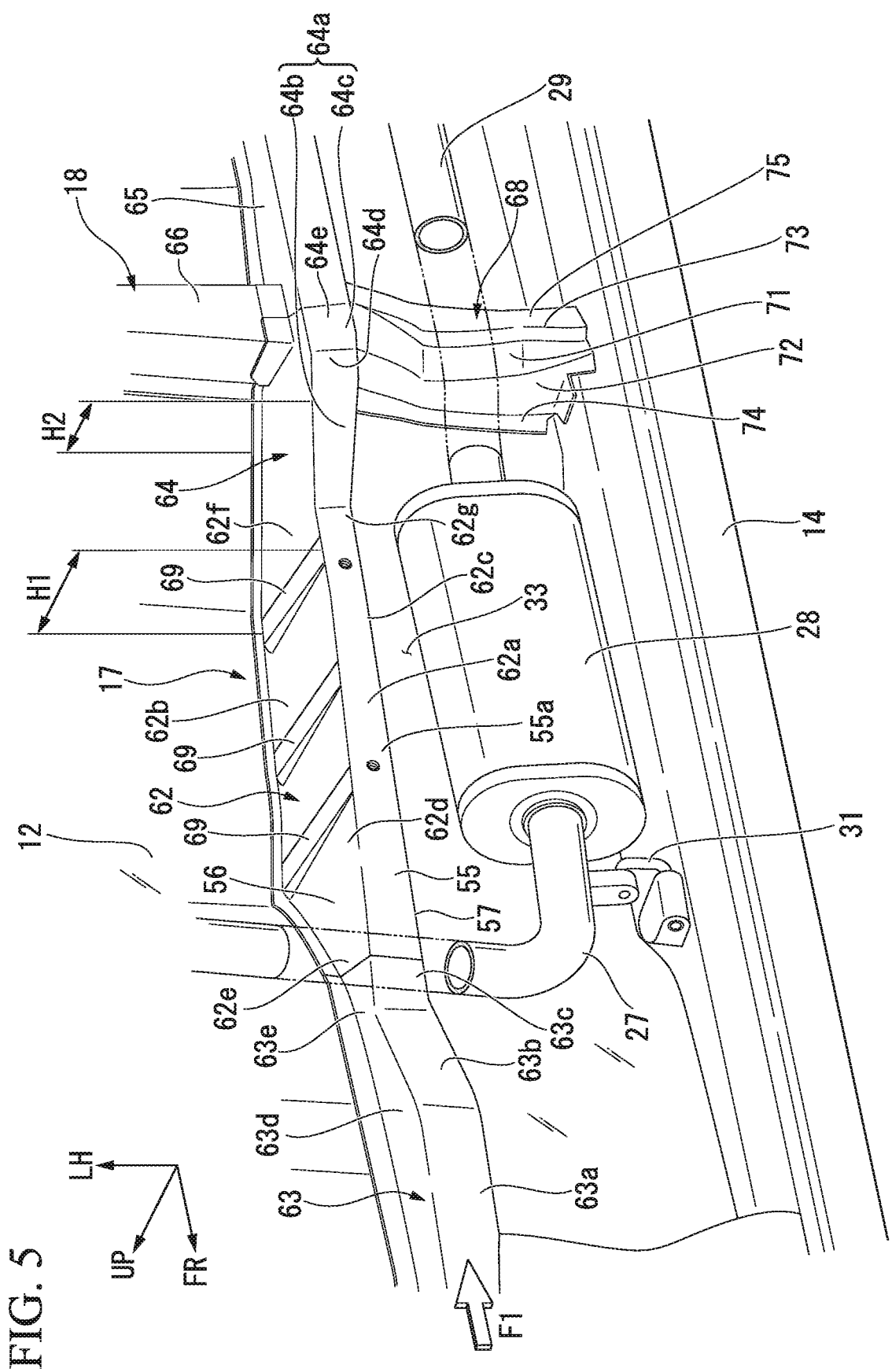
FIG. 5 is a perspective view showing a right floor frame in FIG. 2 in the first embodiment of the present invention.

As illustrated in FIG. 5, the right floor frame 17 includes a central frame portion 62, a front frame portion 63, a first rear frame portion 64, and a second rear frame portion 65. The central frame portion 62 is disposed to face the fuel tank 21 (refer to FIG. 2) in the vehicle width direction. The central frame portion 62 is formed to have a height H1 larger than that of the front frame portion 63, the first rear frame portion 64 or the second rear frame portion 65.

That is to say, the central frame portion 62 includes a central bottom portion 62a, a central inner wall 62b, and a central outer wall 62c. The central bottom portion 62a is a portion corresponding to the central frame portion 62 of the bottom portion 55 in the right floor frame 17. The central inner wall 62b is a portion corresponding to the central frame portion 62 of the inner wall 56 in the right floor frame 17. The central outer wall 62c is a portion corresponding to the central frame portion 62 of the outer wall 57 in the right floor frame 17.

A plurality of inner vertical beads 69 are formed on the central inner wall 62b. The inner vertical beads 69 extend in a vertical direction from a lower end of the central inner wall 62b (that is, the central bottom portion 62a) to an upper end of the central inner wall 62b. In addition, the inner vertical beads 69 are formed in an inclined shape to expand greatly inward in the vehicle width direction as they extend toward the upper end of the central inner wall 62b. In other words, the inner vertical beads 69 extend in an upward/downward direction.

Also, a plurality of outer vertical beads 70 (refer to FIG. 3) are formed on the central outer wall 62c.

The outer vertical beads 70 are formed to be substantially symmetrical to the inner vertical beads 69. Thus, a detailed description of the outer vertical beads 70 will be omitted.

In this way, the height H1 of the central frame portion 62 is formed to be larger than that of the front frame portion 63, the first rear frame portion 64, or the second rear frame portion 65. Furthermore, the inner vertical beads 69 are formed on the central inner wall 62b and the outer vertical beads 70 are formed on the central outer wall 62c. Thus, the rigidity of the central frame portion 62 is increased. Therefore, the rigidity of the floor panel 12 is secured by the central frame portion 62.

The front frame portion 63 extends substantially horizontally from a front end portion 62d of the central frame portion 62 toward the front side of the vehicle body. The front frame portion 63 is formed in a closed cross section together with the floor panel 12 as in the central frame portion 62.

The front frame portion 63 includes a front bottom portion 63a. The front bottom portion 63a is a portion corresponding to the front frame portion 63 of the bottom portion 55 in the right floor frame 17.

The front bottom portion 63a includes a front inclined portion 63b and a front horizontal portion 63c. The front inclined portion 63b extends to have a rising slope from a substantial center 63d in the forward/rearward direction of the vehicle body to a rear portion 63e toward the rear side of the vehicle body. The front horizontal portion 63c extends substantially horizontally from a rear end of the front inclined portion 63b to a front end 62e of the central bottom portion 62a toward the rear side of the vehicle body.

The first rear frame portion 64 extends to have a falling slope from a rear end portion 62f of the central frame portion 62 to the cross member 18 toward the rear side of the vehicle body. The first rear frame portion 64 is formed in the closed cross section together with the floor panel 12 as in the central frame portion 62.

The first rear frame portion 64 includes a first rear bottom portion 64a. The first rear bottom portion 64a is a portion corresponding to the first rear frame portion 64 of the bottom portion 55 in the right floor frame 17.

The first rear bottom portion 64a includes a first rear inclined portion 64b and a first rear portion 64c. The first rear inclined portion 64b extends to have a falling slope from a rear end portion 62g of the central bottom portion 62a to the first rear portion 64c (that is, the cross member 18). The first rear portion 64c extends substantially horizontally from a rear end 64d of the first rear inclined portion 64b toward the rear side of the vehicle body.

In the first rear frame portion 64, a height H2 from the floor panel 12 to the first rear bottom portion 64a is formed to be substantially constant.

The second rear frame portion 65 extends substantially horizontally from a rear end portion 64e of the first rear frame portion 64 toward the rear side of the vehicle body. The second rear frame portion 65 is formed in the closed cross section together with the floor panel 12 as in the central frame portion 62.

Here, in the right floor frame 17, a concave portion 55a recessed upward is formed in the bottom portion 55. A front inclined portion of the concave portion 55a is formed in an inclined shape by the front inclined portion 63b of the front frame portion 63. Furthermore, a rear inclined portion of the concave portion 55a is formed in an inclined shape by the first rear inclined portion 64b of the first rear frame portion 64. In addition, a bottom portion of the concave portion 55a is formed substantially horizontally by the central bottom portion 62a and the front horizontal portion 63c.

The concave portion 55a of the right floor frame 17 is formed above the first exhaust pipe 27. In this way, when the concave portion 55a of the right floor frame 17 is formed above the first exhaust pipe 27, it is possible to avoid the first exhaust pipe 27 from interfering with the right floor frame. Thus, the first exhaust pipe 27 is disposed on an upper side.

Also, the muffler 28 is disposed in the region 33 enclosed by the right side sill 14, the right floor frame 17, and the right cross member 68. Thus, the muffler 28 communicating with the first exhaust pipe 27 is disposed on an upper side.

In addition, as illustrated in FIG. 4, the canister 23 is disposed in the region 38 enclosed by the left side sill 13, the left floor frame 16, and the cross member 18 (specifically, the left cross member 67). Thus, the canister 23 is disposed on an upper side.

In this way, when the muffler 28 (refer to FIG. 5) or the canister 23 is disposed on an upper side, a minimum ground clearance of the vehicle is secured.

As illustrated in FIG. 5, the first rear frame portion 64 is located on a rear side of the concave portion 55a (that is, the rear side of the vehicle body of the central bottom portion 62a). As described above, the first rear frame portion 64 is formed such that the height H2 from the floor panel 12 to the first rear bottom portion 64a is substantially constant. Thus, the closed cross section of the first rear frame portion 64 and the floor panel 12 is formed to be substantially constant (that is, constant cross section).

Thus, for example, when an impact load F1 is input from the front side of the vehicle body to the right floor frame 17, the input impact load F1 can be supported by the right floor frame 17.

Referring again to FIG. 1, the cross member 18 includes the central cross member 66, the left cross member 67, and the right cross member 68. The central cross member 66 spans between the left floor frame 16 and the right floor frame 17 and extends in the vehicle width direction. An upper portion of the central cross member 66 is joined to the floor panel 12. A closed cross section is formed by the central cross member 66 and the floor panel 12.

Figure 6:
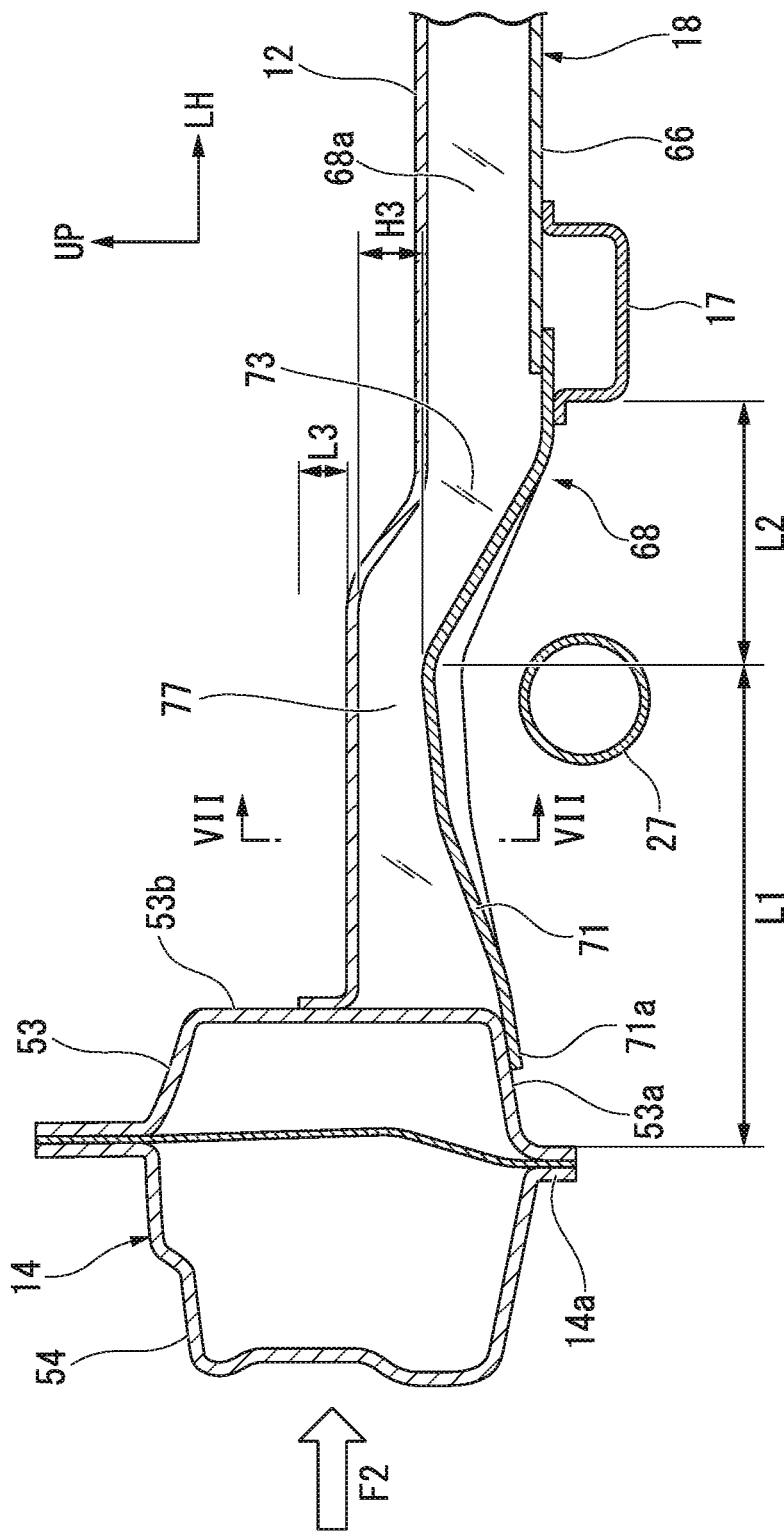
FIG. 6 is a cross-sectional view taken along line VI-VI in FIG. 1 in the first embodiment of the present invention.
Figure 7:
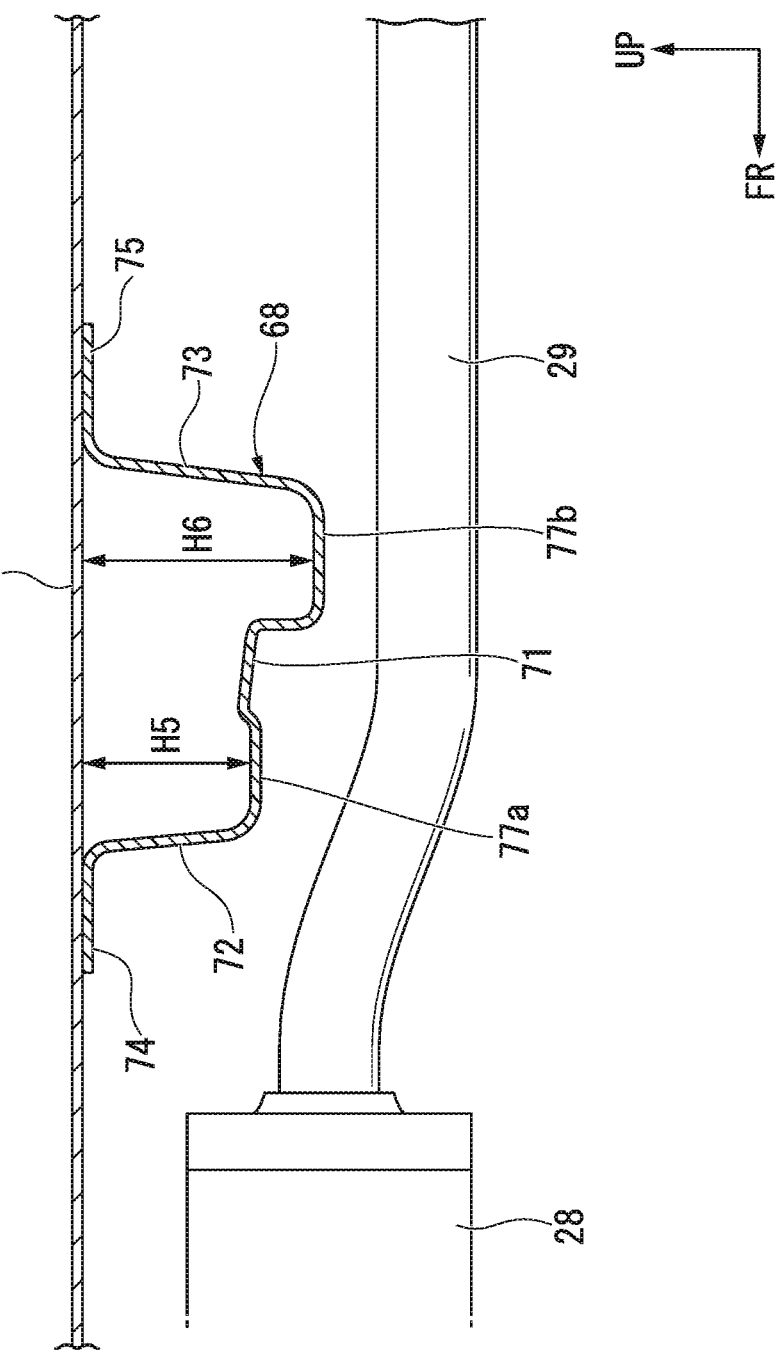
FIG. 7 is a cross-sectional view taken along line VII-VII in FIG. 6 in the first embodiment of the present invention.

As illustrated in FIGS. 6 and 7, the right cross member 68 spans between the right floor frame 17 and the right side sill 14 and extends in the vehicle width direction. The right cross member 68 includes a bottom portion 71, a front wall 72, a rear wall 73, a front flange 74, and a rear flange 75. When the front flange 74 and the rear flange 75 are joined to the floor panel 12, a closed cross section is formed by the right cross member 68 and the floor panel 12.

In the bottom portion 71, an outer end portion 71a is joined to a lower portion 53a of the right side sill 14 (specifically, the inner member 53). Outer end portions of the front wall 72 and the rear wall 73 are joined to an inner wall 53b of the inner member 53. Furthermore, outer end portions of the front flange 74 and the rear flange 75 are joined to the inner wall 53b of the inner member 53.

A substantial center portion of the bottom portion 71 in the vehicle width direction expands upward. Thus, a height H3 of the substantial center portion in the right cross member 68 is smaller than the other portions. Thus, an upward deformation guiding part 77 is formed on the substantial center portion of the right cross member 68.

That is to say, in the upward deformation guiding part 77, the bottom portion 55 of the right cross member 68 is formed to be recessed upward. Thus, when an impact load F2 is input from the outside in the vehicle width direction to the right side sill 14, the upward deformation guiding part 77 is deformed upward by the impact load F2. When the upward deformation guiding part 77 is deformed upward, the right cross member 68 is deformed to be ridge-folded upward (bent in an inverted V shape).

Incidentally, the respective strengths of the inner wall 53b of the inner member 53, the lower portion 53a of the inner member 53, the upward deformation guiding part 77, and the right floor frame 17 are set as follows. That is to say, the strengths are set to be increased in the order of the inner wall 53b, the lower portion 53a, the upward deformation guiding part 77, and the right floor frame 17.

In other words, a strength of the lower portion 53a is set to be higher than a strength of the inner wall 53b. Furthermore, a strength of the upward deformation guiding part 77 is set to be higher than the strength of the lower portion 53a. In addition, a strength of the right floor frame 17 is set to be higher than the strength of the upward deformation guiding part 77.

Here, a first distance from the upward deformation guiding part 77 to a lower flange 14a in the right side sill 14 is L1. Furthermore, a second distance from the upward deformation guiding part 77 to the right floor frame 17 is L2. In addition, an amount of displacement of the right floor frame 17 upward is L3.

In this state, a relationship between L1, L2, and L3 is set as follow:

$$L1-L2 \geq L3.$$

When the second distance L2 is suppressed to be smaller than the first distance L1, the right floor frame 17 is brought close to the upward deformation guiding part 77. Thus, when the right cross member 68 is deformed to be ridge-folded due to the deformation of the upward deformation guiding part 77, a portion 68a corresponding to the right floor frame 17 is displaced upward. Thus, the right floor frame 17 is displaced upward together with the portion 68a of the right floor frame 17.

Also, the upward deformation guiding part 77 has a first portion 77a on the muffler 28 side and a second portion 77b opposite to the muffler 28. The first portion 77a is located above the second portion 77b.

Thus, a distance H5 from the floor panel 12 to a lower end of the first portion 77a is smaller than a distance H6 from the floor panel 12 to a lower end of the second portion 77b. Therefore, a strength of the first portion 77a is set to be lower than a strength of the second portion 77b.

Thus, when the upward deformation guiding part 77 is displaced upward, particularly, it is possible to easily deform the first portion 77a on the muffler 28 side to a ridge-folded state upward. Therefore, when the upward deformation guiding part 77 is deformed, it is possible to reliably displace the right floor frame 17 on the muffler 28 side upward.

It should be noted that the reason why the right floor frame 17 is displaced upward will be described in detail later.

Referring again to FIG. 4, the left cross member 67 spans between the left floor frame 16 and the left side sill 13. The left cross member 67 is a member which is substantially symmetrical to the right cross member 68 and a detailed description of the left cross member 67 will be omitted.

Figure 8:
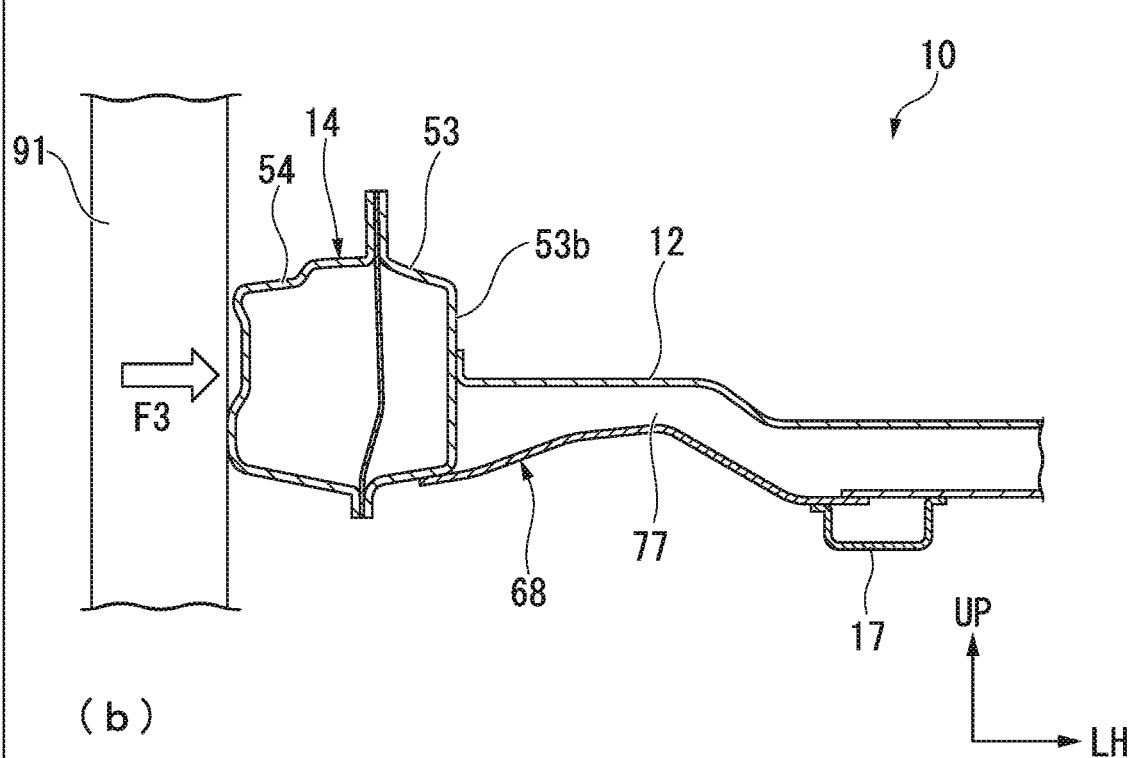
FIG. 8 is a cross-sectional view for explaining an example in which a right side sill in the first embodiment of the present invention is deformed by an impact load.
Figure 8:
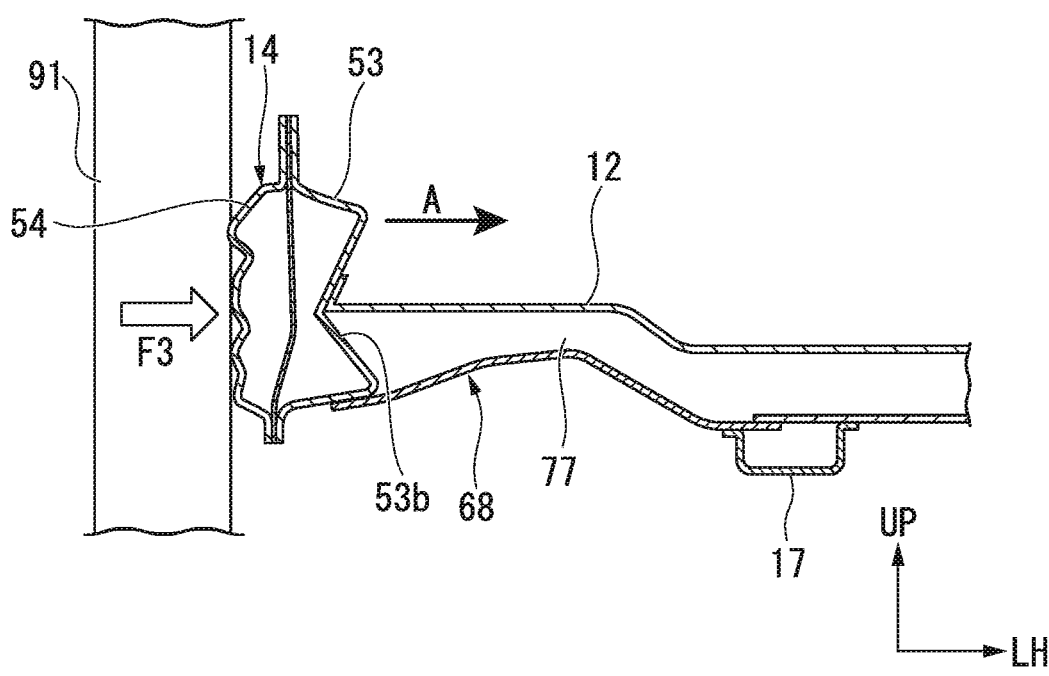
Figure 9:
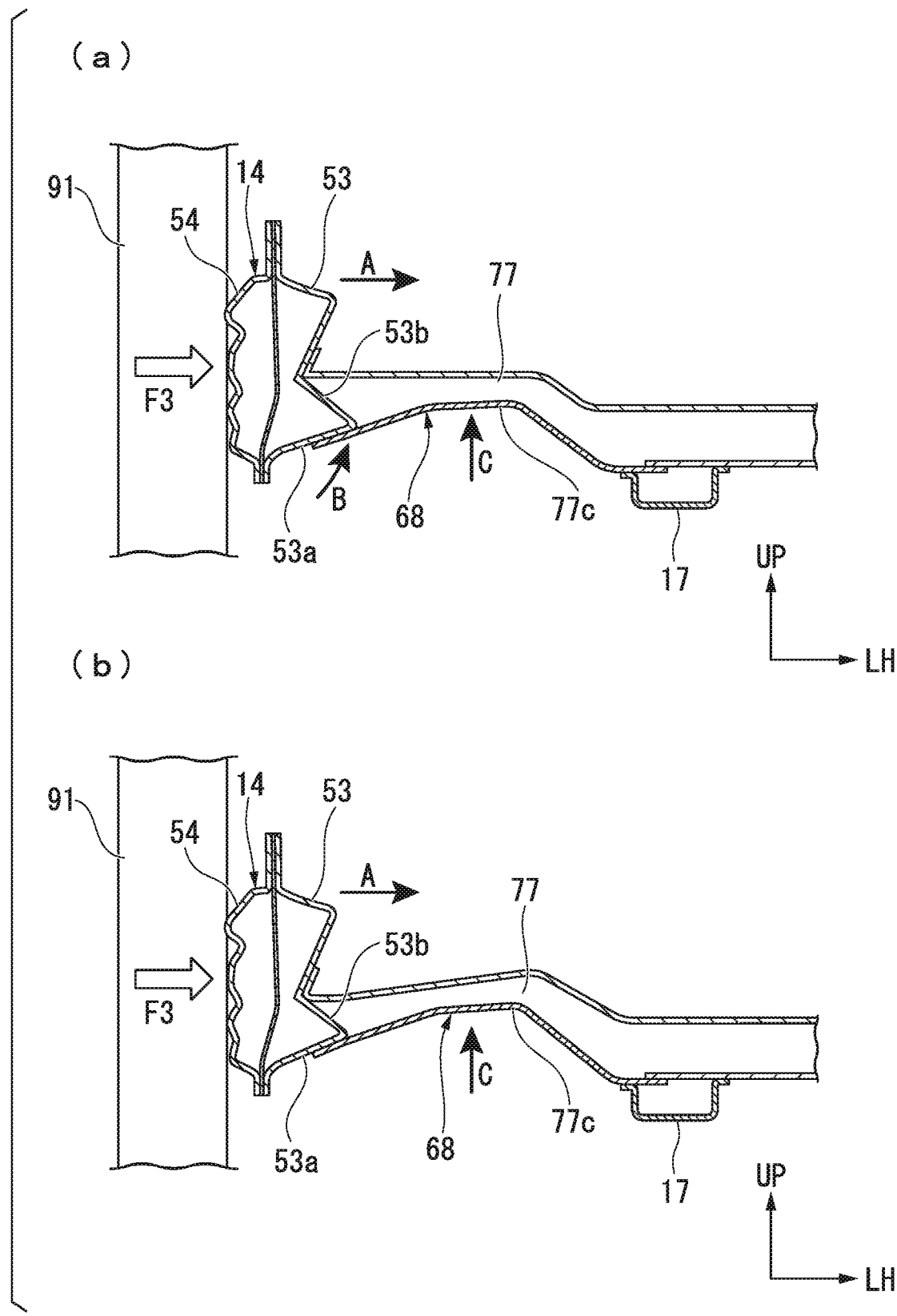
FIG. 9 is a cross-sectional view for explaining an example in which a right cross member in the first embodiment of the present invention is deformed.
Figure 10:
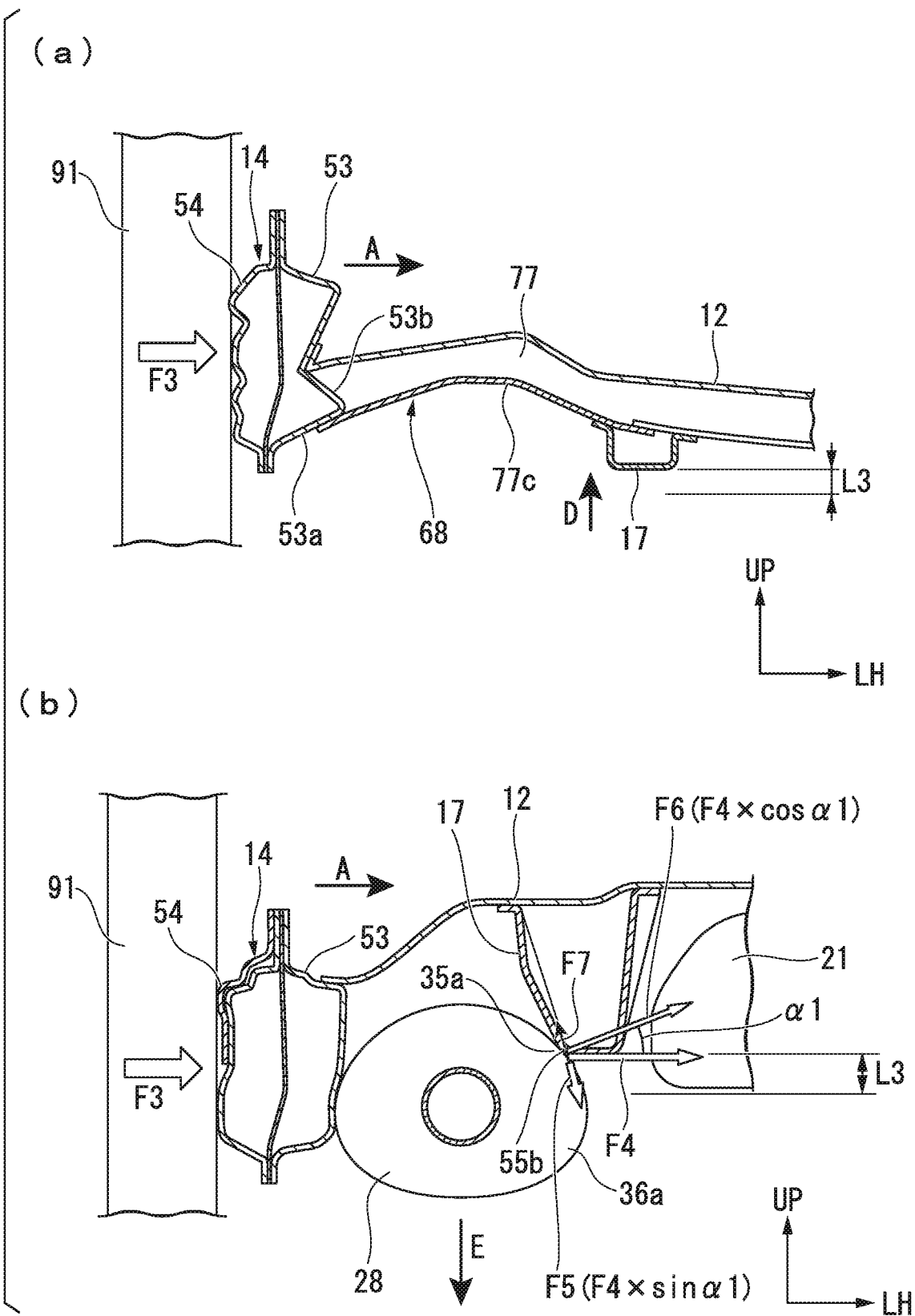
FIG. 10 is a cross-sectional view for explaining an example in which a muffler in the first embodiment of the present invention is pushed downward.

An example in which, when an impact load F3 is input to the right side sill 14, the impact load F3 is absorbed by the structure 10 for a lower portion of a vehicle body will be described below on the basis of FIGS. 8 to 10.

As illustrated in FIG. 8(a), an obstacle 91 collides with the outer member 54 in the right side sill 14 from a lateral side in the vehicle width direction. The impact load F3 is input from the obstacle 91 to the outer member 54.

As illustrated in FIG. 8(b), the outer member 54 in the right side sill 14 is deformed.

Here, the strengths are set to be increased in the order of the inner wall 53b of the right side sill 14 (the inner member 53), the lower portion 53a of the inner member 53, the upward deformation guiding part 77, and the right floor frame 17.

Thus, after the outer member 54 in the right side sill 14 is deformed, the right side sill 14 moves as indicated by an arrow A. Therefore, the inner wall 53b of the inner member 53 is recessed in a concave shape (specifically, a substantially V shape) by the right cross member 68 or the floor panel 12.

As illustrated in FIG. 9(a), the lower portion 53a of the inner member 53 is deformed to have a rising slope inward in the vehicle width direction as indicated by an arrow B. Thus, a lower portion 77c of the upward deformation guiding part 77 is bent upward as indicated by an arrow C.

As illustrated in FIG. 9(b), when the lower portion 77c of the upward deformation guiding part 77 is bent upward, the upward bending of the upward deformation guiding part 77 starts. That is to say, the upward ridge-folding deformation (inverted-V-shaped bent deformation) of the right cross member 68 starts.

As illustrated in FIG. 10(a), the right cross member 68 is bent upward in an inverted V shape.

Here, as illustrated in FIG. 6, the relationship between L1, L2, and L3 is set to L1−L2≥L3.

Thus, as illustrated in FIG. 10(a), when the right cross member 68 is bent upward in an inverted V shape, the right floor frame 17 is lifted upward by an amount of displacement L3 as indicated by an arrow D.

As illustrated in FIG. 10(b), when the right side sill 14 moves as indicated by the arrow A, the right side sill 14 interferes with the muffler 28. In this state, the muffler 28 moves in an arrow A direction together with the right side sill 14 and interferes with the right floor frame 17.

Here, the right floor frame 17 is lifted upward by the amount of displacement L3.

Also, the muffler 28 is attached to the right side sill 14. The right side sill 14 moves as indicated by the arrow A in a horizontal direction without moving upward. Thus, the upward displacement of the muffler 28 is avoided.

Therefore, it is possible to allow the upper left curved surface 35a of the muffler 28 to reliably interfere with the right floor frame 17 (specifically, a lower portion 55b of the right floor frame 17). When the upper left curved surface 35a interferes with the lower portion 55b of the right floor frame 17, a load F4 is input from the upper left curved surface 35a of the muffler 28 to the lower portion 55b of the right floor frame 17.

Also, a radius of the upper left curved surface 35a in the muffler 28 is formed to be larger than a radius of the lower left curved surface 36a. Thus, when the load F4 is input from the upper left curved surface 35a of the muffler 28 to the lower portion 55b of the right floor frame 17, a downward component force F5 of the load F4 is significantly larger than an upward component force F7 thereof.

Here, the downward component force F5 and the upward component force F7 are expressed by the following expressions:

$$F5 = F4 \times \sin \alpha 1$$

$$F6 = F4 \times \cos \alpha 1$$

$$F7 = \mu 1 \times F6.$$

Here, α1 is an angle between a straight line (normal line) orthogonal to a tangential line in which the upper left curved surface 35a is in contact with the lower portion 55b of the right floor frame 17 and the load F4.

μ1 is a coefficient of friction between the upper left curved surface 35a and the lower portion 55b of the right floor frame 17.

In this way, the downward component force F5 is larger than the upward component force F7. Thus, the muffler 28 is reliably pushed downward as indicated by an arrow E by the downward component force F5. Therefore, it is possible to displace the right side sill 14 inward in the vehicle width direction to the right floor frame 17.

Accordingly, it is possible to preferably absorb the impact load F3 input to the right side sill 14 by appropriately deforming the right side sill 14 inward in the vehicle width direction without affecting the fuel tank 21.

Figure 11:
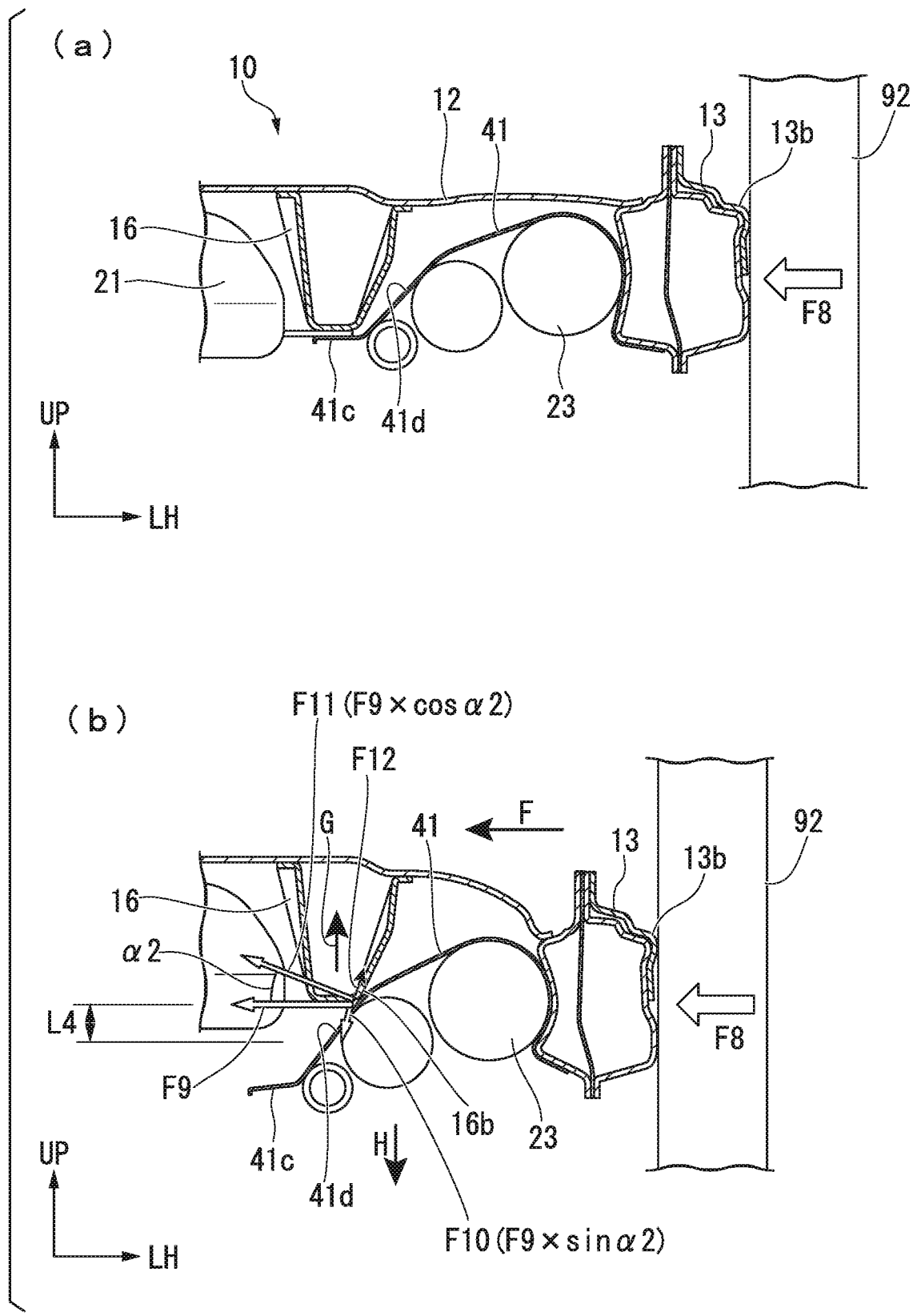
FIG. 11 is a cross-sectional view for explaining an example in which a canister in the first embodiment of the present invention is pushed downward by an impact load.
Figure 12:
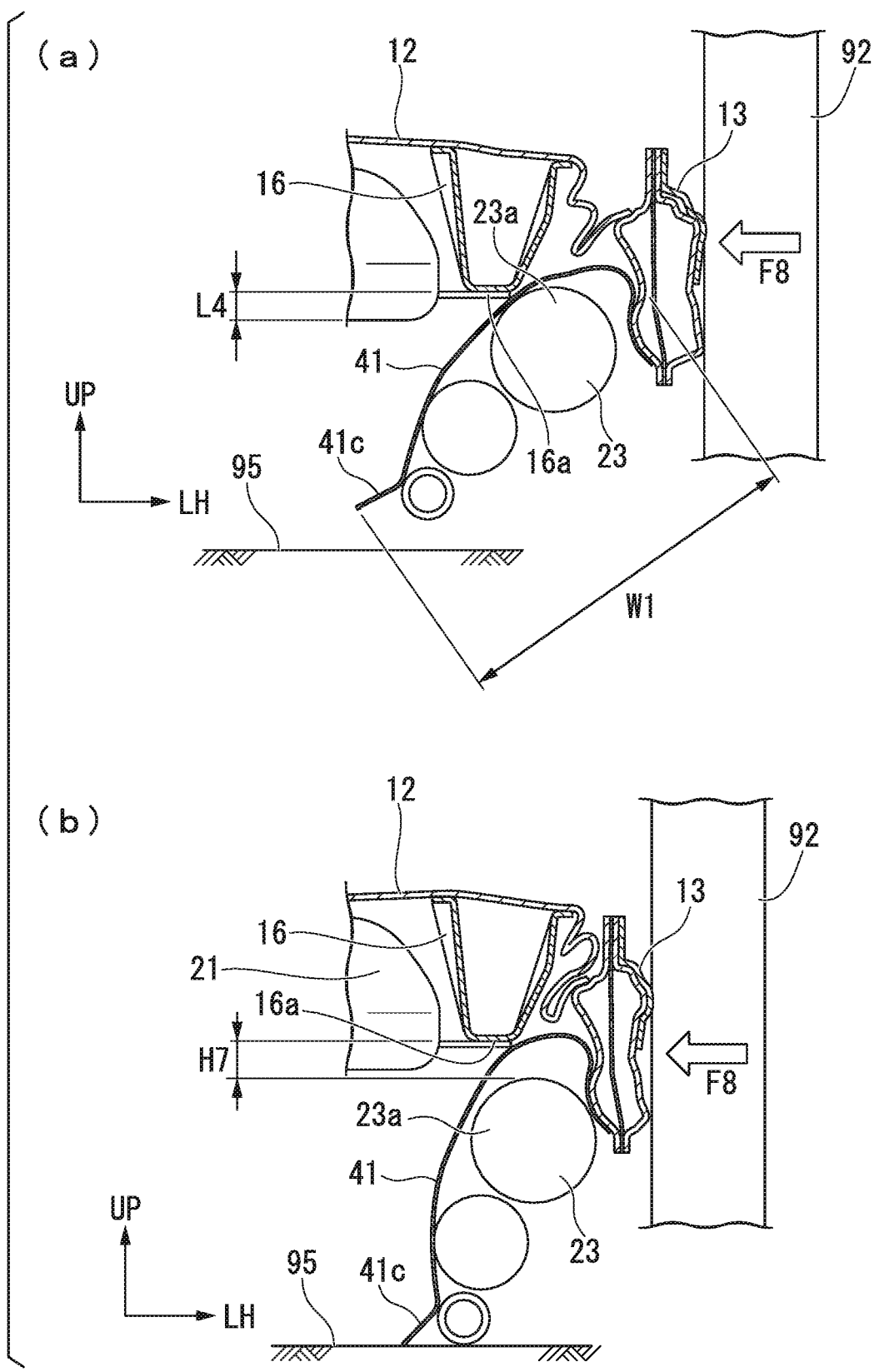
FIG. 12 is a cross-sectional view for explaining an example in which an impact load is absorbed by deforming a left side sill in the first embodiment of the present invention.

An example in which, when an impact load F8 is input to the left side sill 13, the impact load F8 is absorbed by the structure 10 for a lower portion of a vehicle body will be described below on the basis of FIGS. 11 and 12.

As illustrated in FIG. 11(a), an obstacle 92 collides with the left side sill 13 from a lateral side in the vehicle width direction. The impact load F8 is input from the obstacle 92 to the left side sill 13.

As illustrated in FIG. 11(b), an outer wall 13b of the left side sill 13 is deformed.

After the outer wall 13b in the left side sill 13 is deformed, the left side sill 13 moves as indicated by an arrow F inward in the vehicle width direction. Thus, the left cross member 67 (refer to FIG. 4) is deformed to be upward-ridge-folded (an inverted V shape) as in the right cross member 68. Therefore, the left floor frame 16 is lifted upward as indicated by an arrow G by an amount of displacement L4.

Also, when the left side sill 13 moves as indicated by the arrow F, the canister 23 moves in an arrow F direction together with the left side sill 13. When the canister 23 moves, the right inclined portion 41d of the attachment brackets 41 interferes with a lower portion 16b of the left floor frame 16.

The right inclined portion 41d is formed in an inclined shape to have a rising slope from each of the inner end portions 41c outward in the vehicle width direction. Thus, when a load F9 is input from the right inclined portion 41d of the attachment brackets 41 to the left floor frame 16, a downward component force F10 of the load F9 is significantly larger than an upward component force F12 thereof.

Here, the downward component force F10 and the upward component force F12 are expressed by the following expressions:

$$F10 = F9 \times \sin \alpha 2$$

$$F11 = F9 \times \cos \alpha 2$$

$$F12 = \mu 2 \times F11.$$

Here, α2 is an angle between a straight line (normal line) orthogonal to a tangential line in which the right inclined portion 41d is in contact with the lower portion 16b of the left floor frame 16 and the load F9.

μ2 is a coefficient of friction between the right inclined portion 41d and the lower portion 16b of the left floor frame 16.

In this way, when the downward component force F10 is larger than the upward component force F12, the canister 23 (particularly, the inner end portions 41c side of the attachment brackets 41) is pushed downward as indicated by an arrow H by the downward component force F10.

As illustrated in FIG. 12(a), the canister 23 and the attachment brackets 41 are members having a larger width W1 in the vehicle width direction than the muffler 28 (refer to FIG. 3). For this reason, when the canister 23 falls due to the impact load F8 input to the left side sill 13, each of the inner end portions 41c of the attachment brackets 41 is considered to come into contact with the ground 95.

For this reason, there is a concern concerning the minimizing of falling of the canister 23 and the interposing of an upper portion 23a of the canister 23 between the left side sill 13 and the left floor frame 16. Thus, the deformation of the left side sill 13 is minimized by the upper portion 23a of the canister 23. Therefore, it is difficult to appropriately absorb the impact load F8 input to the left side sill 13.

Accordingly, the left cross member 67 (refer to FIG. 4) is deformed in an inverted V shape upward and the left floor frame 16 is lifted upward by the amount of displacement L4.

As illustrated in FIG. 12(b), the canister 23 falls and each of the inner end portions 41c of the attachment brackets 41 comes into contact with the ground 95. In this state, the bottom portion 16a of the left floor frame 16 is displaced upward by a height H7 with respect to the upper portion 23a of the canister 23.

Thus, it is possible to deform the left side sill 13 inward in the vehicle width direction to the left floor frame 16 without affecting the canister 23 (particularly, the upper portion 23a). Therefore, it is possible to appropriately deform the left side sill 13 inward in the vehicle width direction without affecting the fuel tank 21. Accordingly, it is possible to appropriately absorb the impact load F8 input to the left side sill 13.

Second Embodiment

A structure 100 for a lower portion of a vehicle body according to a second embodiment will be described. Note that constituent elements in the second embodiment that are the same as or similar to those of the first embodiment will be denoted by the same reference numerals and a detailed description thereof will be omitted.

Figure 13:
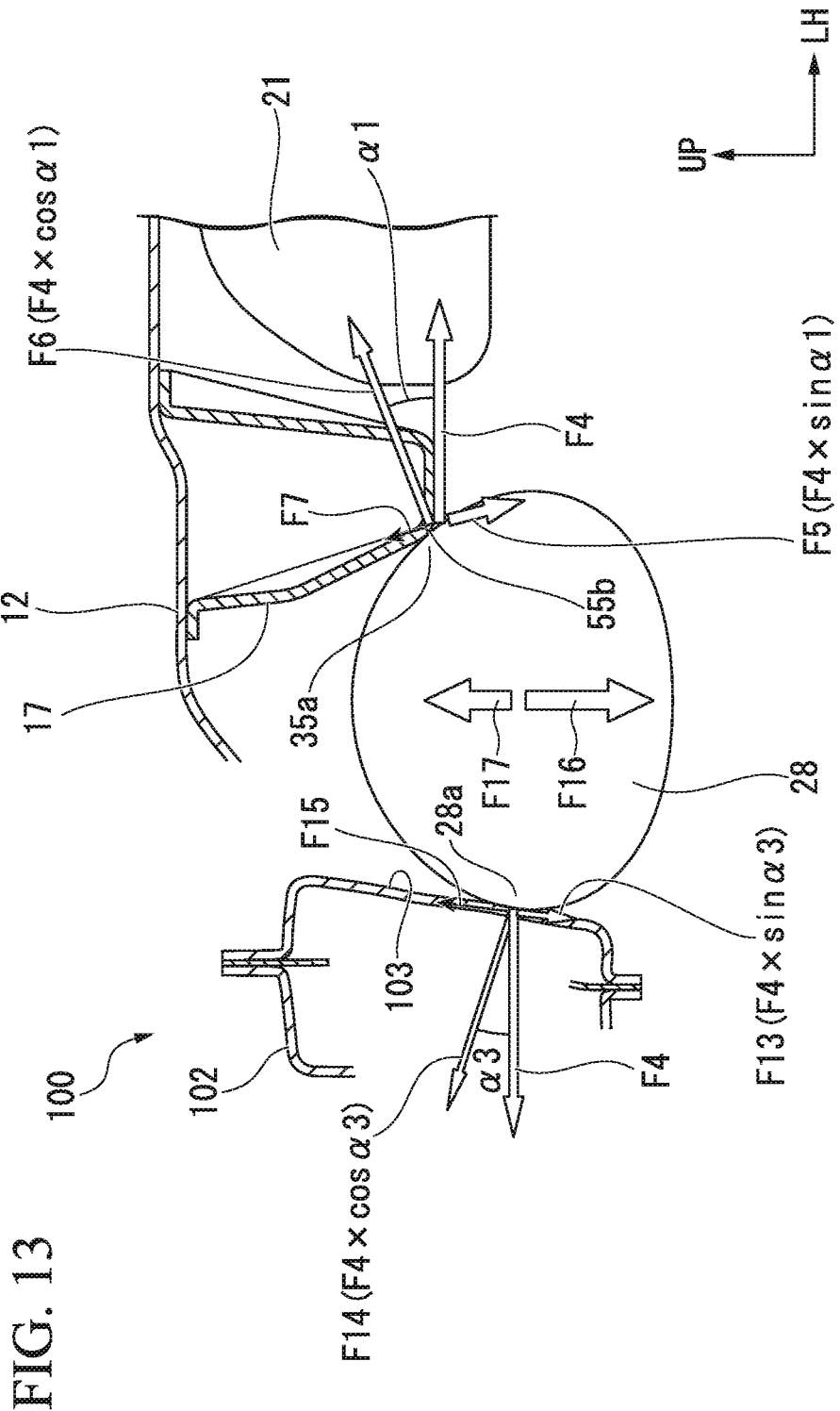
FIG. 13 is a cross-sectional view for explaining an example in which a muffler in a second embodiment of the present invention is pushed downward.

As illustrated in FIG. 13, it is assumed that the structure 100 for a lower portion of a vehicle body has a state in which an in-vehicle component (muffler 28) is strongly sandwiched between a right side sill 102 and a right floor frame 17 in some cases.

In this case, a coefficient of friction of an inner wall 103 in the right side sill 102 need also be taken into consideration.

The inner wall 103 in the right side sill 102 has a predetermined coefficient of friction μ3. Thus, the muffler 28 is strongly sandwiched between the right side sill 102 and the right floor frame 17 in a state in which an upward deformation guiding part 77 (refer to FIG. 9(b)) is deformed upward due to an impact load input to the right side sill 102.

A load F4 is input from an upper left curved surface 35a of the muffler 28 to a lower portion 55b of the right floor frame 17 and the load F4 is input from a right side surface 28a of the muffler 28 to the inner wall 103 of the right side sill 102.

When the load F4 is input to the inner wall 103 in the right side sill 102, the load F4 is divided into a downward component force F13 and an upward component force F15.

The downward component force F13 and the upward component force F15 are expressed by the following expressions:

$$F13 = F4 \times \sin \alpha 3$$

$$F14 = F4 \times \cos \alpha 3$$

$$F15 = \mu 3 \times F14.$$

Here, α3 is an angle between a straight line (normal line) orthogonal to a tangential line in which the right side surface 28a of the muffler 28 comes into contact with the inner wall 103 in the right side sill 102 and the load F4.

It should be noted that, in the right side sill 102, there are a case in which the inner wall 103 is inclined in advance before an impact load is input to the right side sill 102 and a case in which the inner wall 103 is inclined due to the deformation of the right side sill 102 after an impact load is input.

μ3 is a coefficient of friction between the right side surface 28a of the muffler 28 and the inner wall 103 in the right side sill 102.

Here, a pushing force F16 of pushing the muffler 28 downward and a frictional force F17 acting on the muffler 28 are expressed by the following expressions:

$$F16 = F5 \times \cos \alpha 1 + F13 \times \cos \alpha 3$$

$$F17 = F7 \times \cos \alpha 1 + F15 \times \cos \alpha 3.$$

Thus, when the pushing force F16 is set to be larger than the frictional force F17, it is possible to reliably push the muffler 28 downward. Therefore, it is possible to appropriately absorb an impact load input to the right side sill 102 by appropriately deforming the right side sill 102 inward in the vehicle width direction without affecting the fuel tank 21 as in the first embodiment.

Also in the case of a canister 23, when the pushing force F16 is set to be larger than the frictional force F17 as in the muffler 28, it is possible to reliably push the canister 23 downward. Thus, it is appropriately absorb an impact load input to the right side sill 102 by appropriately deforming the right side sill 102 inward in the vehicle width direction without affecting the fuel tank 21 as in the first embodiment.

Note that the technical scope of the present invention is not limited to the embodiments and various changes can be applied without departing from the gist of the present invention.

While an example in which, for example, the inner vertical beads 69 and the outer vertical beads 70 are formed in the central frame portion 62 has been described in the embodiments, the present invention is not limited thereto. As another example, it is possible to form any one of the inner vertical beads 69 and the outer vertical beads 70 in the central frame portion 62.

Also, while the fuel tank 21 is exemplified as an energy source in the embodiments, the present invention is not limited thereto. For example, batteries, fuel cell stacks, and the like can also be used as an energy source.

REFERENCE SIGNS LIST 10 structure for lower portion of vehicle body
12 floor panel
13, 14 left and right side sills (side sills)
16, 17 left and right floor frames (floor frames)

21 fuel tank (energy source)
23 canister (in-vehicle component)
27 first exhaust pipe (exhaust pipe)
28 muffler (in-vehicle component)
33, 38 region
35a upper left curved surface (upper portion curved surface)
36a lower left curved surface (lower portion curved surface)
51 passenger compartment
53b inner wall of right side sill
53a lower portion of right side sill
55a concave portion
62 central frame portion
62b central inner wall (inner wall of central frame portion)
62c central outer wall (outer wall of central frame portion)
64 first rear frame portion (rear frame portion)
67, 68 left and right cross members (cross members)
69, 70 inner and outer vertical beads (vertical beads)
77 upward deformation guiding part
77a first portion (portion on in-vehicle component side)
77b second portion (portion opposite to in-vehicle component side)
F2, F3, F8 impact load
F4, F9 load
F5, F10, F13 downward component force
F7, F12, F15 upward component force
F16 pushing force
F17 frictional force
H1 height of central frame portion
L1 first distance
L2 second distance
L3, L4 amount of displacement

The invention claimed is:

1. A structure for a lower portion of the vehicle body, comprising:
a floor panel provided below a passenger compartment;
a side sill provided on an outer side of the floor panel in a vehicle width direction and configured to extend in a forward/rearward direction of a vehicle body;
a floor frame provided inside the side sill in the vehicle width direction and configured to extend in the forward/rearward direction of the vehicle body;
an energy source provided inside the floor frame in the vehicle width direction;
a cross member configured to span between the floor frame and the side sill and configured to extend in the vehicle width direction; and
an in-vehicle component provided in a region which is enclosed by the side sill, the floor frame, and the cross member and is located below the cross member,
wherein the cross member has an upward deformation guiding part capable of being deformed upward due to an impact load input to the side sill, and
wherein the in-vehicle component is configured such that, when a load is input to the floor frame due to an interference of the in-vehicle component in a state in which the upward deformation guiding part is deformed upward, a downward component force of the load applied to the in-vehicle component is larger than an upward component force thereof.

2. The structure for a lower portion of the vehicle body according to claim 1, wherein the in-vehicle component is a muffler, and
the muffler is formed in a substantially elliptical shape and a radius of an upper portion curved surface on the floor frame side is larger than a radius of a lower portion curved surface thereon.

3. The structure for a lower portion of the vehicle body according to claim 1, wherein the in-vehicle component is a canister.

4. The structure for a lower portion of the vehicle body according to claim 1, wherein the side sill, the floor frame, and the cross member are configured such that a value obtained by subtracting a second distance from the upward deformation guiding part to the floor frame from a first distance from the upward deformation guiding part to the side sill is greater than or equal to an amount of displacement of the floor frame upward.

5. The structure for a lower portion of the vehicle body according to claim 4, wherein, in the upward deformation guiding part,
a strength of a portion on the in-vehicle component side is lower than that of a portion opposite to the in-vehicle component side in the forward/rearward direction of the vehicle body.

6. The structure for a lower portion of the vehicle body according to claim 4, wherein the in-vehicle component is attached to the side sill.

7. The structure for a lower portion of the vehicle body according to claim 2, wherein the floor frame has:
a concave portion formed above an exhaust pipe joined to the muffler and avoiding the exhaust pipe; and
a rear frame portion located on a rear side of the concave portion and formed in a constant cross section.

8. A structure for a lower portion of the vehicle body, comprising:
a floor panel provided below a passenger compartment;
a side sill provided on an outer side of the floor panel in a vehicle width direction and configured to extend in a forward/rearward direction of a vehicle body;
a floor frame provided inside the side sill in the vehicle width direction and configured to extend in the forward/rearward direction of the vehicle body;
an energy source provided inside the floor frame in the vehicle width direction;
a cross member configured to span between the floor frame and the side sill and configured to extend in the vehicle width direction; and
an in-vehicle component provided which is in a region enclosed by the side sill, the floor frame, and the cross member and is located below the cross member,
wherein the cross member has an upward deformation guiding part capable of being deformed upward due to an impact load input to the side sill, and
wherein the in-vehicle component is configured such that, when the in-vehicle component is sandwiched between the side sill and the floor frame in a state in which the upward deformation guiding part is deformed upward and a load is input to each of the side sill and the floor frame due to the inference of the in-vehicle component,
a downward resultant force of the load applied to the in-vehicle component is greater than an upward resultant force thereof.

* * * * *